US006962013B1

(12) United States Patent
Perrin

(10) Patent No.: US 6,962,013 B1
(45) Date of Patent: Nov. 8, 2005

(54) LICENSE PLATE FRAME

(75) Inventor: Patrick Perrin, Rancho Palos Verdes, CA (US)

(73) Assignee: Perrin Manufacturing Company, City of Industry, CA (US)

(*) Notice: Subject to any disclaimer, the term of this patent is extended or adjusted under 35 U.S.C. 154(b) by 0 days.

(21) Appl. No.: 10/857,064

(22) Filed: May 28, 2004

(51) Int. Cl.$^7$ .............................................. G09F 7/00
(52) U.S. Cl. ...................................... 40/209; D12/193
(58) Field of Search ........................ 40/209; 428/346; D12/193

(56) References Cited

U.S. PATENT DOCUMENTS

| | | | |
|---|---|---|---|
| 1,536,414 A | 5/1925 | Watts |  |
| 1,573,087 A | 2/1926 | Morrissey |  |
| 1,660,575 A | 2/1928 | Overton |  |
| 1,689,088 A | 10/1928 | Tafelski |  |
| 1,816,741 A | 7/1931 | Orester |  |
| D105,000 S | 6/1937 | Duryea |  |
| 2,105,679 A | 1/1938 | Weindel |  |
| 2,197,676 A | 4/1940 | Barth |  |
| 2,211,085 A | 8/1940 | Thomas |  |
| 2,322,135 A | 6/1943 | Howell |  |
| 2,406,286 A | 8/1946 | Gantnier |  |
| D155,951 S | 11/1949 | Willoughby |  |
| D167,878 S | 10/1952 | Bessolo |  |
| D167,885 S | 10/1952 | Gazan |  |
| D168,638 S | 1/1953 | Roper |  |
| 2,869,261 A | 1/1959 | Audette |  |
| 3,755,945 A | 9/1973 | McEwen |  |
| 4,924,611 A | 5/1990 | Shaw |  |
| 5,002,312 A * | 3/1991 | Phillips et al. | ................. 283/72 |
| 5,383,294 A | 1/1995 | Shen |  |
| D361,971 S | 9/1995 | Wang |  |
| D382,241 S | 8/1997 | Moureaux |  |
| 5,763,052 A | 6/1998 | Carr |  |
| 5,878,516 A | 3/1999 | Amirian |  |
| D413,848 S | 9/1999 | Doerr |  |
| 6,180,207 B1 * | 1/2001 | Preisler et al. | .............. 428/139 |
| 6,209,905 B1 * | 4/2001 | Preisler et al. | ............ 280/728.2 |
| 6,210,794 B1 * | 4/2001 | Nakamura | ............... 428/32.79 |
| D441,335 S | 5/2001 | Hussaini |  |
| 6,262,807 B1 | 7/2001 | Pleotis |  |
| D466,457 S | 12/2002 | Wang |  |
| D474,724 S | 5/2003 | Wang |  |
| D485,522 S | 1/2004 | Ohm |  |
| 2001/0023011 A1 * | 9/2001 | Preisler et al. | .............. 428/156 |
| 2002/0030829 A1 | 3/2002 | Pleotis | ....................... 358/1.2 |

FOREIGN PATENT DOCUMENTS

| EP | 0 211 185 A1 | 6/1986 |
|---|---|---|
| EP | 0 488 484 A1 | 8/1991 |

* cited by examiner

Primary Examiner—Gary C. Hoge
(74) Attorney, Agent, or Firm—Michael Fedrick; Jeffrey G. Sheldon; Sheldon & Mak

(57) ABSTRACT

License plate frames having recessed areas in the frame surface which form characters, words, and/or graphics, and having an adhered layer of material of contrasting color on the frame surface.

8 Claims, 2 Drawing Sheets

US 6,962,013 B1

LICENSE PLATE FRAME

BACKGROUND

Decorative license plate frames, in particular those for automobile license plates, frequently include words or decorative symbols on their surfaces. For example, automobile dealerships often include their names on license plate frames as a form of advertisement. One method of forming words or symbols on a frame surface is to screen print them on a flat surface of a molded frame. Words can also be bonded or otherwise attached to a surface of a frame. A further method of forming words on a license plate frame is to integrally mold them on the surface of a plastic frame. Letters formed in this way are raised above a flat surface of the frame, and a layer of contrasting colored material is applied to the letters' raised surface.

These methods of forming characters in a license plate frame, however, suffer from several drawbacks. Screen printed lettering, for example, lacks the visual depth of a raised letter. Raised lettering, however, is subject both to fading due to sun exposure as well as to physical wear. Bonded lettering is subject to the strength and durability of the adhesive or other means used to attach the lettering to a frame, and such lettering may become detached from the frame over time.

SUMMARY

The license plate frames described herein overcome the drawbacks of prior license plate frames through the use of recessed areas in a frame surface and an adhered layer of material having a contrasting color. The present frames for a vehicle license plate include a substrate having a substantially planar surface, a contrast layer adhered to this surface which has a contrasting color compared with the color of the surface, and one or more recessed portions in the substrate. The frames are preferably made from a plastic material having a thickness of between about 120 and about 135 thousandths of an inch, and the recessed portions in the substrate are preferably about 50 thousandths of an inch deep. The recessed portions meet the surface of the substrate at a substantially non-radiused edge and form or highlight one or more characters in the frame. The recessed portions can form complete letters or other characters, or can in addition include a contrasting portion to form part of a character. Such a contrasting portion has an upper surface which is substantially coplanar with the substantially planar surface of the substrate, and the contrast layer is adhered to this surface. The contrasting portion can alternatively form a complete character, in which case the recessed portion provides a contrasting background for the character.

Such frames can be made by forming a frame body having a substantially planar surface and at least one character formed by a recessed surface in the frame body, and then adhering a contrast layer to the substantially planar surface of the frame body and not to the recessed surface. The frame body has a first color, and the contrast layer has a second color that contrasts with the first. Preferably, at least one recessed surface forms a complete letter or other character. The contrast layer can be adhered through the use of a hot stamp foil. A transfer surface of the hot stamp foil comprising a layer of colored material is placed onto the substantially planar surface of the frame body, after which heat and pressure are applied to a working surface (the other side) of the hot stamp foil, thereby forming the layer of colored material on the substantially planar surface of the frame body. The recessed surface and the substantially planar surface preferably meet at a substantially non-radiused edge in order to facilitate removal of the hot stamp foil from the surface of the frame.

In an alternative to this method, a character can be formed by a raised surface present in a recessed surface of the frame body. The raised surface is substantially coplanar with the substantially planar surface of the frame body, and the contrast layer is formed on this raised surface at the same time as on the substantially planar surface. The recessed surface in this embodiment can serve as a background to a character formed by the raised surface, or alternatively the raised service can help to form a character outlined by the recessed surface.

DRAWINGS

These and other features, aspects and advantages of the present invention will become better understood with regard to the following description, appended claims, and accompanying figures where:

Figure 1:
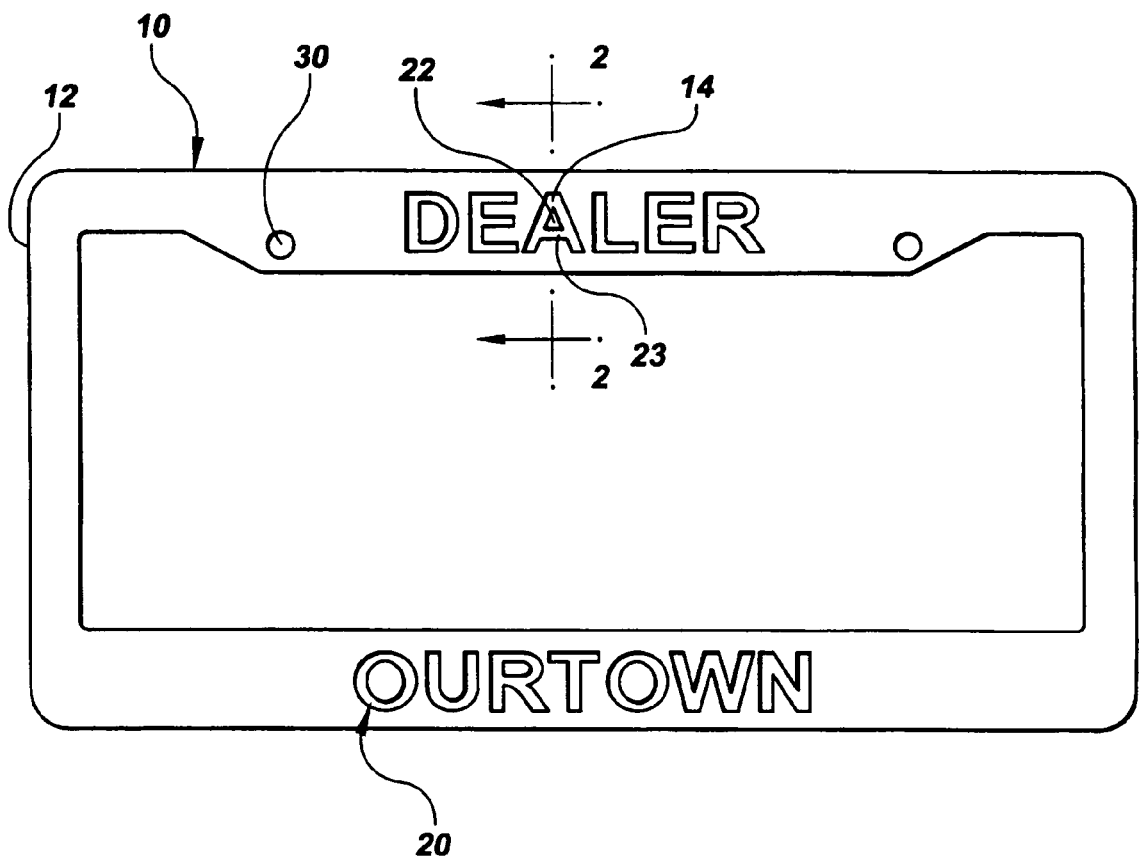
FIG. 1 is a plan view of a frame having recessed characters.

All dimensions specified in this disclosure are by way of example only and are not intended to be limiting. Further, the proportions shown in these Figures are not necessarily to scale. As will be understood by those with skill in the art with reference to this disclosure, the actual dimensions of any device or part of a device disclosed in this disclosure will be determined by their intended use.

DETAILED DESCRIPTION

The vehicle license plate frames described herein provide an improved combination of surface features and character display features compared with prior frames. The present frames 10, for example, comprise characters 20 formed in recessed areas 14 of a frame body 12 which are not subject to as much wear or exposure to the elements compared with raised lettering on a frame. The frame body 12, for supporting or containing a vehicle license plate, comprises a substrate 13 having a substantially planar outer surface 15. Recessed portions 14 in the frame body 12 are molded, cut, or otherwise formed in the substrate 13. As used herein, "recessed portion" refers to an area of the frame body 12 having a surface which extends below the plane of the substantially planar surface 15 of the substrate 13, i.e. away from the substantially planar surface 15 in the direction of the rear surface of the frame 10.

The recessed portions 14 of the frame 10 and the substantially planar surface 15 of the substrate 13 meet and are joined at an edge 17 of the substantially planar surface 15. The wall or walls 18 defining the recessed portion 14 extend away from this edge 17, preferably at an angle of less than about 90 degrees from the substrate surface 15, such as an angle of about 85 degrees, though walls extending at a less steep angle are also practicable with an injection molded frame. In a preferred embodiment, a recessed portion 14 includes a base 19 comprising a surface in the recessed portion 14 connected to the walls 18. The base 19 can preferably be planar and parallel to the substantially planar outer surface 15.

The material of the frame body 12, which is preferably monochromatic, has a first color. The recessed portions 14 formed in the frame body 12 thus have this first color. The frame body 12 further includes a layer of material 16 adhered to the substantially planar surface 15 which has a second color that contrasts with the first color of the frame body 12. The term "contrast" and variations thereof is used herein to refer to colors which can be distinguished by an average human observer with good vision (i.e., approximately 20/20 vision, with or without correction) in mid-day outdoor lighting conditions when placed side by side with each other. The term "colors" refers to any hue in the visible spectrum and includes black, white, and gray, as well as various finishes such as matte, glossy, and metallic. Contrast generally increases with increased difference in color wavelengths. For example, red color having a wavelength of 700 nanometers generally contrasts more with yellow having a wavelength of 580 nanometers than with orange having a wavelength of 620 nanometers. When the contrasting colors are black, white and/or gray, contrast can be measured as the difference in brightness between the lightest and darkest shades.

The edge 17 joining the recessed portions 14 and the substantially planar surface 15 of the substrate 13 is substantially non-radiused, i.e. is a sharp edge. When a contrast layer 16 is applied to the frame 10 from a transfer sheet comprising an ink or other coloring agent, such as a hot stamp foil, and the transfer sheet is subsequently removed from the surface 15 of the frame, the use of a substantially non-radiused edge results in a clean separation between the coloring agent adhered to the frame 10 and the coloring agent remaining on the transfer sheet. The resulting outer edge 111 of the contrast layer 16 is thereby given a generally smooth appearance. The edges 17, if they are slightly radiused (for example, due to manufacturing tolerances and variations), should have a radius which is less than the depth of the recessed portion 14, that is, the distance from the plane of the substantially planar surface 15 to the base 19 of the recessed portion 14. Preferably the radius is less than half of this depth, and more preferably less than a tenth of this depth.

The characters 20 of the frame can be formed by recessed portions 14 in the substrate 13 of the frame 10. As used herein, the term "character" refers to any number, letter, punctuation mark, picture or other symbol or graphic image that can be formed by a recess in the surface of the frame body 12 and the contrast layer 16. A character 20 can be formed completely by the recessed portion 14, or a further contrasting portion 24 that borders or falls within the recessed portion 14 can be used in addition to form a character 20, as described below.

In one embodiment, the frame 10 includes one or more discontinuous recessed portions 14, and the recessed portions 14 form either the entire character 20 or at least a portion of the character 20. For example, as shown in FIG. 1, a complete character 20 depicting the letter "L" (in the word DEALER) can be formed entirely from a recessed portion 14, i.e., the boundaries of the letter comprise the boundaries between the recessed portion 14 and the surface of the frame substrate 13.

For some characters 20, however, a contrasting portion 24 within the character 20 is needed in order to form the character 20. For example, in order to form the letter "A" as shown in FIG. 1, a small contrasting portion 24 within the recessed portion forming the letter is required, i.e. the roughly triangular segment 22, in order to form the recessed crossbar 23 of the letter. In order to form such a contrasting portion 24 within the recessed portion 14 of the character 20, the contrasting portion 24 includes a character upper surface 26 which is substantially coplanar with the surface 15 of the substrate 13. In this way, the same contrast layer 16 adhered to the substrate 13 can likewise be adhered to the character upper surface 26.

Figure 3:
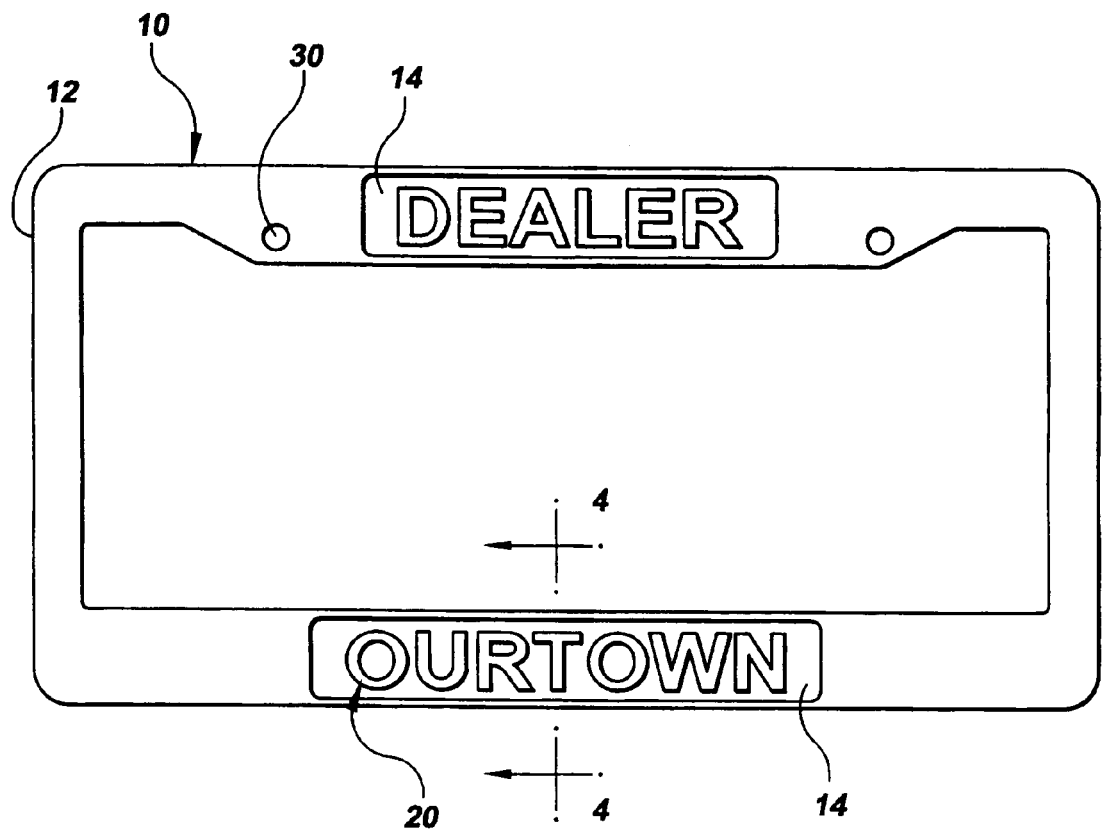
FIG. 3 is a plan view of a frame having raised characters surrounded by recessed areas of the frame.
Figure 4:
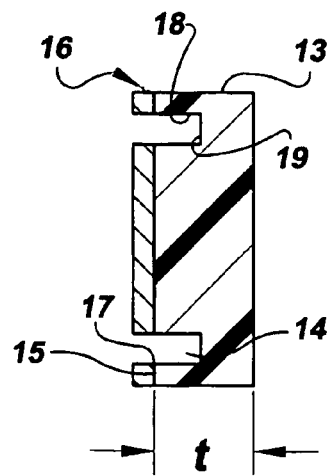
FIG. 4 is a sectional view of the frame of FIG. 3 along line 4—4.

In an alternative embodiment, the contrasting portion 24 forms a complete character 20. For example, the characters 20 shown in FIG. 3 comprise a character upper surface 26 overlayed by a contrast layer 16 (as shown in FIG. 4). In this embodiment, the contrasting portion 24 which forms a character 20 can be entirely within a recessed portion 14 as shown in FIG. 3, or alternatively the character 20 can be joined to the substrate 13 by a joining portion (not illustrated). The recessed portion 14 in this embodiment thus forms a background which highlights the characters 20 formed by the contrasting portion 24.

Frames are designed to provide support to the license plates with which they are used and are generally attached to the license plates and/or to the vehicles for which the license plates are issued. For example, the frame 10 shown in FIG. 1 includes screw holes 30 for receiving screws (not shown). In order to mount the frame 10 and a license plate, the screws are placed through screw holes 30 and then through corresponding holes provided in the license plate. The frame 10 and license plate can then be placed together onto the surface of a vehicle having two corresponding holes for receiving the screws. The screws are then lined up with the holes in the vehicle and rotated in order to screw them into the vehicle holes.

Frames 10 can have two holes 30 as shown in FIGS. 1 and 3, or alternatively can be provided with further holes for engaging screws or other mounting means (or even with only one hole). Four-hole automobile license plates and frames are commonly used. Other ways of securing a frame 10 and license plate to a vehicle can also be employed, though it is preferred that the frame 10 and license plate be removably secured to a vehicle (as is the case when screws are used).

The rear surface (not shown) of the frame 10 is in contact with the front surface (i.e. the surface designed to be viewed) of a license plate when the frame 10 and license plate are secured to a vehicle. The rear surface can have attached thereto clips, hooks, or other means for further securing the license plate to the frame 10. Additionally or alternatively, a lip (not shown) extending away from the front surface of the frame 10 can be provided along the periphery of the frame 10 in order to help retain a license plate.

To form a frame 10 as described herein, a frame body 12 is formed from a suitable material, such as plastic, i.e. a synthetic or semisynthetic polymer material that can be molded or extruded into objects. Preferably, a plastic material such as high impact polystyrene or ABS is used, and the frame body 12 is injection molded. A minimum wall thickness on the frame 10 of 0.075 inch to 0.100 inch is preferably maintained to achieve optimum filling of the mold during the injection molding process and to minimize the tendency of the molded part to warp.

Figure 2:
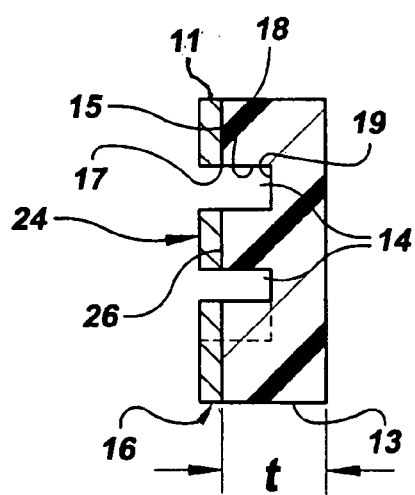
FIG. 2 is a sectional view of the frame of FIG. 1 along line 2—2.

In this embodiment, the face of the frame body 12 carrying the characters 20 to be displayed preferably has a thickness ("t" in FIGS. 2 and 4) of between about 120 and 135 thousandths of an inch. While the use of a substrate 13 having a lesser thickness is possible, this range has been found to produce a desireable visual quality in the recessed characters 20. Recessed portions 14 formed in frames 10 of this thickness are preferably about 50 thousandths of an inch deep, i.e. the base 19 of such a recessed portion 14 is about 50 thousandths of an inch from the plane of the substantially planar surface 15 of the substrate 13. Any characters 20 formed within such a recessed portion 14 thus preferably rise approximately 50 thousandths of an inch high from the base 19 of the recessed portion 14, so that the character upper surface 26 is substantially coplanar with the surface 15 of the frame substrate 13. The characters 20 of the frame 10 are preferably formed together with (e.g., integrally molded with) the rest of the frame body 12, though they could also be formed afterward by cutting into the frame body 12, such as by machine cutting.

In order to apply the contrast layer 16 to the substrate surface 15 and any character upper surfaces 26, a hot stamp foil is preferably brought into contact with these surfaces. As used herein, a "hot stamp foil" refers to a transfer sheet comprising an ink or other coloring agent in a hot melting type adhesive layer of the transfer sheet, as is known in the art. The use of multiple coloring agents can allow an image to be formed in the adhesive layer. The adhesive layer itself is formed on a transfer surface of the transfer sheet, with the opposite surface of the transfer sheet comprising a working surface capable of withstanding the heat and pressure required to transfer the adhesive layer to another surface, and capable of transferring sufficient heat through the transfer sheet for this purpose.

In order to form a contrast layer 16 on the surface 15 of a frame body 12, the transfer surface of the hot stamp foil is placed in contact with the substantially planar substrate surface 15, and the working surface of the hot stamp foil is contacted by a heated surface of approximately 400 degrees Fahrenheit which is also capable of applying pressure, such as a roller or a hydraulic press. Pressure of up to four tons is applied to the working surface for several seconds, after which the hot stamp foil is pulled away from the frame 10, leaving a layer of colored material 16 from the transfer surface of the hot stamp foil adhered to the frame 10. When the edges 17 between the recessed portions of the frame surface and the substantially planar portion of the frame surface are sharp edges, the edges of the contrast layer are clean, i.e. they conform to the edges 17 of the characters 20.

The contrast layer 16 formed by such colored material should have a color which contrasts with the color of the substrate 13, so that a character 20 formed in or by a recessed surface 14 in the substrate 13 can be distinguished by a viewer. In one embodiment, the substrate 13 is black, and the contrast layer has a metallic color, such as chrome, silver, or gold. Preferably, the hot stamp foil has a surface area sufficient to cover all of the substantially planar surface 13 of the frame body 12.

The hot stamp foil and the coloring agent used in the hot stamp foil can be any of a number of different foils and coloring agents known to the art. For example, mylar foil containing a silicone dye can be used. Preferably, a hot stamp foil which creates a metallic appearance on the surface of the frame, such as the brushed chrome foil made by ITW Foils (5 Malcolm Hout Drive, Newburyport, Mass. 01950), is used.

Although the use of a hot stamp foil to transfer a colored layer to a frame 10 is preferred, other methods of producing the contrast layer 16 on the frame surface 15 can be used. The contrast layer 16 should generally comprise an adhesive substance and a coloring agent. The adhesive substance is one capable of holding materials together by surface attachment. Laminating, the use of cold stamp foils, and other methods for creating a colored surface can also be employed to produce the contrast layer 16.

EXAMPLE 1

Frame with characters Formed by Recessed Portions

A frame for an automobile license plate having characters formed by the recessed portions of the frame, such as the Edge FX frame (manufactured by Perrin Manufacturing Co., 1020 Bixby Drive, Industry, Calif. 91745-1703), was formed. The frame body was approximately 120 thousandths of an inch thick and was rectangular, having two shorter parallel sides approximately 6 inches in length and two longer parallel sides approximately 12 inches in length. Recessed letters similar to those shown in FIG. 1 were formed in the front surface of one of the longer sides in order to form the word PRINCETON, while the word RUGBY was formed in the other long side with such recessed letters. The front surface was about ½' wide along the shorter sides and between ⅝ of an inch and 1 inch wide along the longer sides, the width being such as to cover the edges of a license plate placed in the frame. Four holes for retaining screws were formed, two in each of the longer sides.

Adhered to the front surface of the frame was a layer of metallic colored material transferred by a hot stamp foil technique from a brushed chrome foil made by ITW Foils. The edges between the recessed areas of the frame surface and the substantially planar front surface were sharp, and the walls forming the recessed areas extended away from the front surface of the frame at approximately an 85 degree angle. These walls extended approximately 50 thousandths of an inch from the front surface of the frame before reaching a lower surface roughly parallel with the front surface of the frame. The frame substrate was black in color, so the layer of chrome-colored material contrasted with the black-colored recessed letters.

A lip was formed around the outer periphery of the frame body which extended toward the rear surface of the frame at approximately a 90 degree angle to the front surface of the frame. The lip extended approximately ⁵⁄₁₆ of an inch from the front surface and was approximately ⅛ of an inch thick. Two retainer clips were formed in the lip along the longer side which comprised the word RUGBY in order to help retain a license plate.

EXAMPLE 2

Frame with Characters Formed Within a Recessed Portion

A frame having characters formed within the recessed portions of the frame, such as the Panel FX frame (manufactured by Perrin Manufacturing Co., 1020 Bixby Drive, Industry, Calif. 91745-1703), was formed. The frame was identical to the frame of Example 1, except that raised letters similar to those shown in FIG. 3 (rather than recessed letters) were formed in one of the longer sides of the frame in order to form the word "Panel Fx", while the words "Put Your Name Here" were formed in the other long side with such letters. The recessed portion of the front surface of the frame formed a black background which provided contrast to the chrome-colored letters.

EXAMPLE 3

Manufacturing a Frame

A frame body as described in Example 1 was injection molded from impact polystyrene with an overall nominal wall thickness of 0.135" and a minimum wall thickness in the lettering of 0.085" to facilitate the filling of the part and minimize warping. A roll of brushed chrome foil made by ITW Foils was unrolled so as to expose an unused portion of the foil, and the transfer surface (i.e., the surface containing the colored adhesive material) was placed into contact with the substantially planar front surface of the frame. A heated platen at 400 degrees Fahrenheit was pressed against the opposite surface of the hot stamp foil for 2 seconds. The foil was then pulled away from the frame, leaving the front surface covered by a layer of chrome-colored adhesive material. The frame and adhesive layer were allowed to cool for 3 seconds in order to allow the adhesive layer to harden on the frame.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference to their entirety.

What is claimed is:

1. A method of forming a vehicle license plate frame, comprising the steps of:
   (a) forming a frame body having a first color, wherein the frame body comprises a substantially planar surface and at least one character formed by a recessed surface in the frame body; and
   (b) adhering a contrast layer comprising an adhesive substance and a coloring agent having a second color to the substantially planar surface of the frame body and not to the recessed surface, wherein the second color contrasts with the first color.

2. The method of claim 1, wherein at least one recessed surface forms a complete character.

3. The method of claim 1, wherein the recessed surface and the substantially planar surface meet at a substantially non-radiused edge.

4. A method of forming a vehicle license plate frame, comprising the steps of:
   (a) forming a frame body having a first color, wherein the frame body comprises a substantially planar surface and at least one character formed by a recessed surface in the frame body; and
   (b) adhering a contrast layer comprising an adhesive substance and a coloring agent having a second color to the substantially planar surface of the frame body and not to the recessed surface, wherein the second color contrasts with the first color, by:
      (i) providing a hot stamp foil having a transfer surface and a working surface, the transfer surface comprising a layer of colored material;
      (ii) placing the transfer surface of the hot stamp foil onto the substantially planar surface; and
      (iii) applying heat and pressure to the working surface of the hot stamp foil, thereby forming the layer of colored material on the substantially planar surface of the frame body.

5. The method of claim 4, wherein the hot stamp foil has a surface area sufficient to cover the substantially planar surface of the frame body.

6. A method of forming a vehicle license plate frame, comprising the steps of:
   (a) forming a frame body having a first color, wherein the frame body comprises:
      (i) a substantially planar surface; and
      (ii) a character formed in a recessed surface in the frame body, and wherein the character comprises an upper surface; and
   (b) adhering a contrast layer comprising an adhesive substance and a coloring agent having a second color to the substantially planar surface of the frame body and to the upper surface of the character but not to the recessed surface, wherein the second color contrasts with the first color.

7. The method of claim 6, wherein the recessed surface joins the substantially planar surface of the frame body at a substantially non-radiused edge.

8. A method of forming a vehicle license plate frame, comprising the steps of:
   (a) forming a frame body having a first color, wherein the frame body comprises:
      (i) a substantially planar surface; and
      (ii) a character formed in a recessed surface in the frame body, wherein the character comprises an upper surface; and
   (b) adhering a contrast layer comprising an adhesive substance and a coloring agent having a second color to the substantially planar surface of the frame body and to the upper surface of the character but not to the recessed surface, wherein the second color contrasts with the first color, by:
      (i) providing a hot stamp foil having a transfer surface and a working surface, the transfer surface comprising a layer of colored material;
      (ii) placing the transfer surface of the hot stamp foil onto the substantially planar surface; and
      (iii) applying heat and pressure to the working surface of the hot stamp foil, thereby forming the layer of colored material on the substantially planar surface of the frame body.

* * * * *